US010049700B2

(12) United States Patent
Hosoe

(10) Patent No.: US 10,049,700 B2
(45) Date of Patent: Aug. 14, 2018

(54) DISPLAY APPARATUS AND CONTROL METHOD THEREOF

(71) Applicant: CANON KABUSHIKI KAISHA, Tokyo (JP)

(72) Inventor: Hiroshi Hosoe, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/644,935

(22) Filed: Jul. 10, 2017

(65) Prior Publication Data

US 2017/0309308 A1    Oct. 26, 2017

Related U.S. Application Data

(63) Continuation of application No. 14/094,213, filed on Dec. 2, 2013, now Pat. No. 9,734,865.

(30) Foreign Application Priority Data

Dec. 3, 2012   (JP) ................................. 2012-264541
Dec. 3, 2012   (JP) ................................. 2012-264622

(51) Int. Cl.
| | | |
|---|---|---|
| *H04N 5/775* | (2006.01) | |
| *H04N 5/935* | (2006.01) | |
| *H04N 9/80* | (2006.01) | |
| *G11B 27/00* | (2006.01) | |
| *H04N 5/232* | (2006.01) | |
| *H04N 5/77* | (2006.01) | |
| *H04N 9/87* | (2006.01) | |
| *H04N 5/76* | (2006.01) | |

(52) U.S. Cl.
CPC ....... *G11B 27/005* (2013.01); *H04N 5/23245* (2013.01); *H04N 5/772* (2013.01); *H04N 9/87* (2013.01); *H04N 5/76* (2013.01)

(58) Field of Classification Search
USPC .................................. 386/227–230, 239–248
See application file for complete search history.

(56) References Cited

U.S. PATENT DOCUMENTS

2012/0140092 A1* 6/2012 Nourbakhsh ........ H04N 5/2628
348/231.99

* cited by examiner

*Primary Examiner* — Hung Dang
(74) *Attorney, Agent, or Firm* — Cowan, Liebowitz & Latman, P.C.

(57) ABSTRACT

A display apparatus including a display unit, adapted to playback a sequence of images, comprises: a detection configured to detect an attitude of the display apparatus or the display unit; a control unit configured to control the display unit to pause playback of the sequence of images, if the detected attitude of the display apparatus is not substantially aligned with the orientation of an image to be displayed.

15 Claims, 19 Drawing Sheets

(N−1)th MOVING IMAGE

Nth MOVING IMAGE
(PLAYBACK IS
TEMPORALLY STOPPED)

Nth MOVING IMAGE
(PLAYBACK STARTS)

(N−1)th MOVING IMAGE

Nth MOVING IMAGE
(PLAYBACK IS
TEMPORALLY STOPPED)

Nth MOVING IMAGE
(PLAYBACK STARTS)

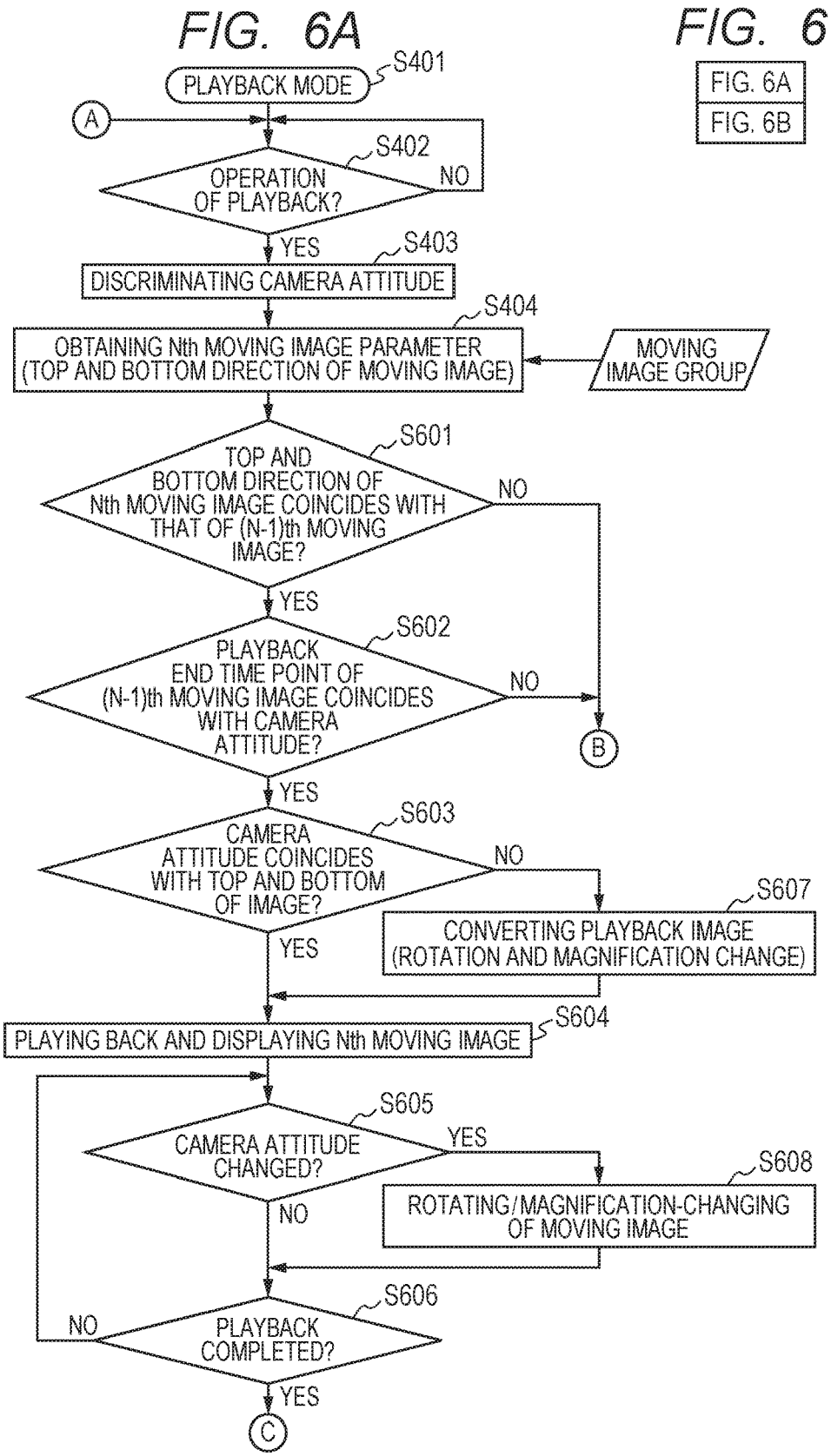

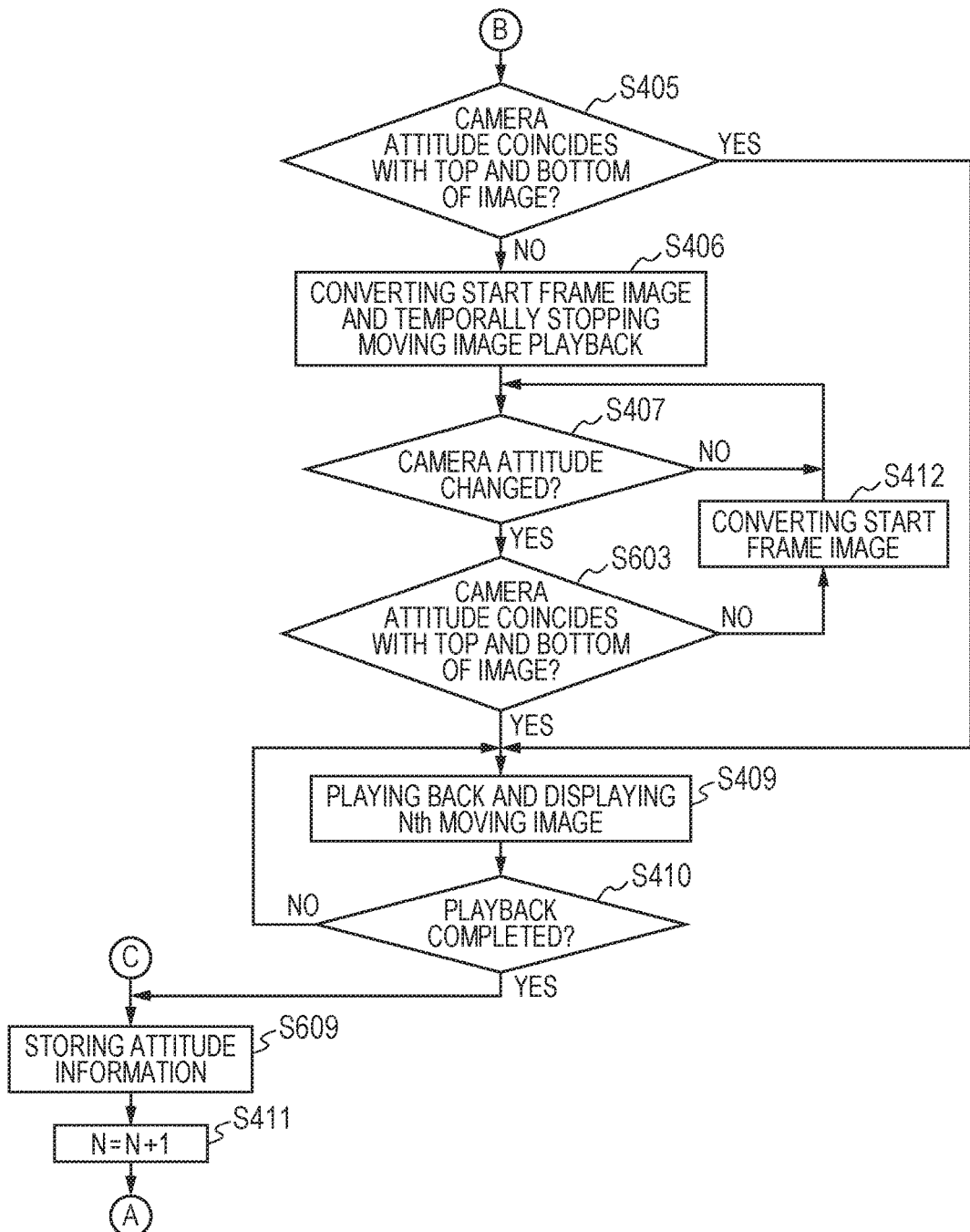

(N−1)th MOVING IMAGE

Nth MOVING IMAGE (N−1)th MOVING IMAGE

Nth MOVING IMAGE

FIG. 18A
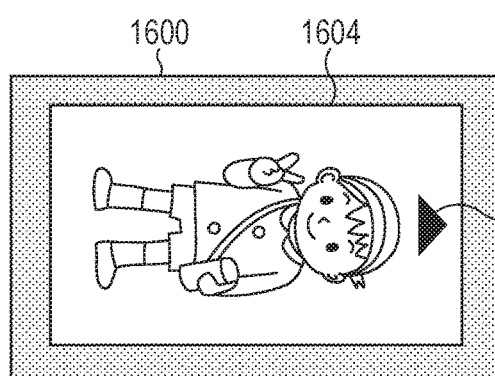
↓ ROTATING COUNTERCLOCKWIZE BY 90 DEGREES
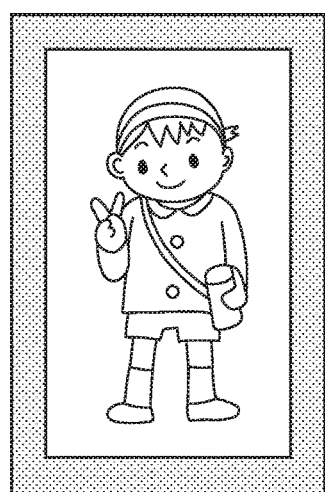
FIG. 18B
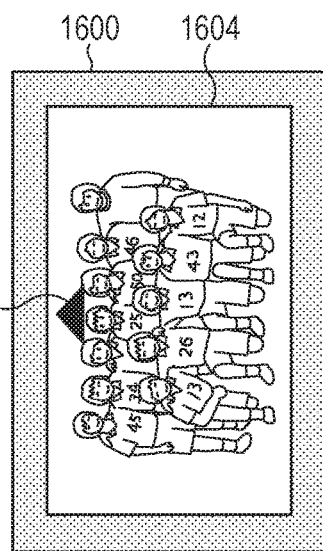
↓ ROTATING CLOCKWIZE BY 90 DEGREES
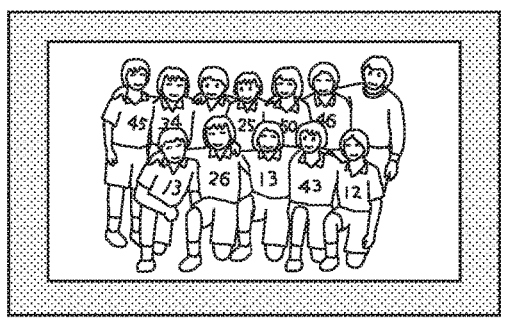

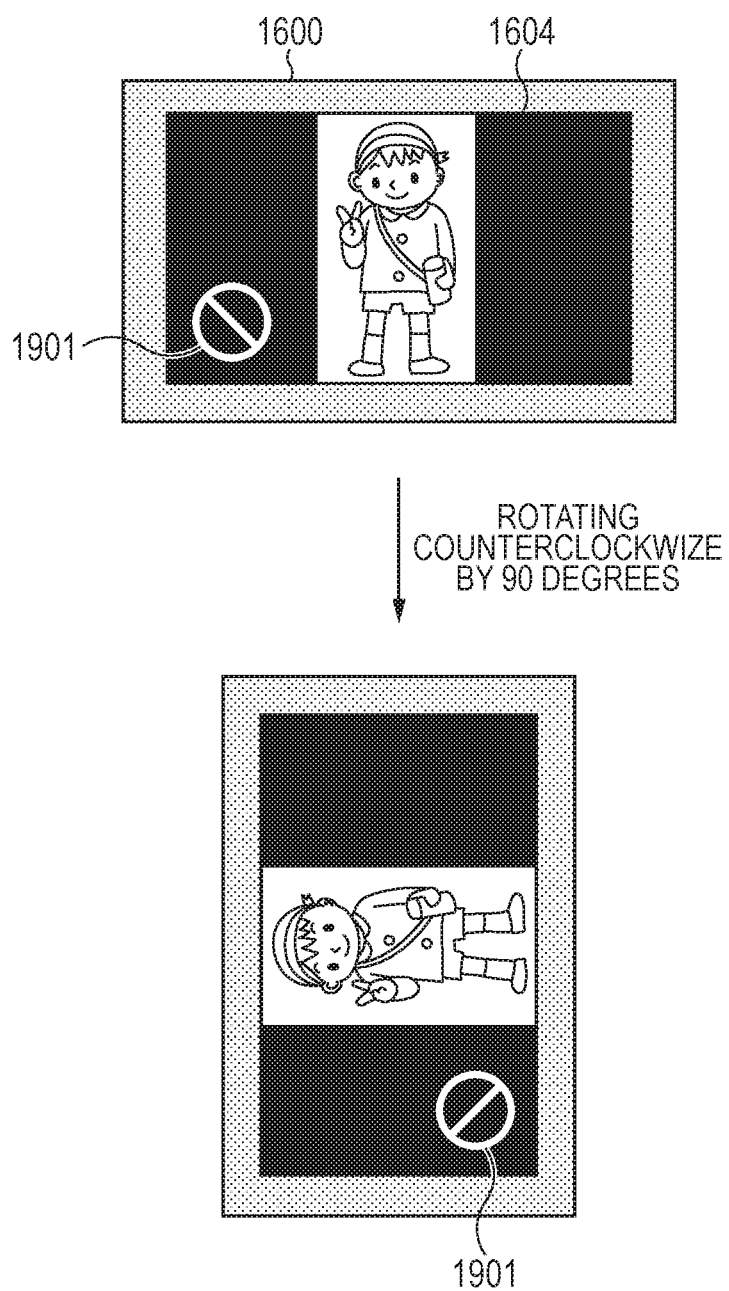

DISPLAY APPARATUS AND CONTROL METHOD THEREOF

CROSS-REFERENCE TO RELATED APPLICATION

This application is a continuation of application Ser. No. 14/094,213, filed Dec. 2, 2013, the entire disclosure of which is hereby incorporated by reference.

BACKGROUND OF THE INVENTION

Field of the Invention

The present invention relates to a display apparatus capable of rotating and displaying an image in accordance with a detected apparatus attitude, and a control method thereof.

Description of the Related Art

In recent years, not only a digital camera and a video camera but also a portable telephone, a music player, and the like are provided with a camera unit or a display unit such as an LCD (liquid crystal display) monitor to allow a user to capture or view a still image or a moving image. In addition, loading the moving image data of TV programs and the like recorded at home into the above-described equipments and tools and viewing them away from home have been widespread.

An image pickup apparatus such as a digital camera is designed supposing to basically handle a horizontal image having an aspect ratio of 4:3 or 16:9 in consideration of the display environment of a conventional TV monitor or the like. For this reason, a monitor unit formed from an LCD or the like also normally has a rectangular screen having an aspect ratio of 4:3 or 16:9.

FIG. 9 is a view showing an example of the photographing attitude of a digital camera 900. When the user holds the digital camera 900 in a normal attitude, as shown in FIG. 9, a horizontal image can be photographed. Hence, the monitor screen is designed to be long in the horizontal direction in accordance with the photographed image. The photographing attitude shown in FIG. 9 will be referred to as a horizontally-oriented attitude, and a photographed image obtained by performing photographing in the horizontally-oriented attitude will be referred to as a horizontally-oriented image hereinafter.

On the other hand, the user also often performs photographing while holding the digital camera 900 rotated by 90° with respect to the horizontally-oriented attitude, as shown in FIG. 10. The attitude shown in FIG. 10 aims at obtaining a vertical image. This photographing attitude will be referred to as a vertically-oriented attitude, and a photographed image obtained by performing photographing in the vertically-oriented attitude will be referred to as a vertically-oriented image hereinafter.

As described above, it is possible to obtain a horizontally-long horizontally-oriented image and a vertically-long vertically-oriented image by changing the manner to hold the digital camera. There is also known a technique of detecting the attitude of the digital camera using a tilt sensor or the like, adding flag information to image data as information (attitude-at-photographing information) representing the digital camera holding manner in photographing, and using the added information for image playback or editing later.

FIGS. 11 to 14 are views showing examples of image display states on the digital camera 900.

FIG. 11 is a view showing a state in which a horizontally-oriented image is displayed in the horizontally-oriented attitude. When the digital camera 900 is set in the horizontally-oriented attitude, the horizontally-oriented image photographed in the horizontally-oriented attitude is displayed so as to fill the monitor screen.

FIG. 12 is a view showing a state in which a vertically-oriented image is displayed in the horizontally-oriented attitude. In this case, the image is rotated and reduced by referring to the above-described flag information, and converted into an image whose long-side length coincides with the short-side length of the monitor screen. The image is displayed while making its top and bottom direction at the time of photographing coincide with the top and bottom direction of the digital camera 900. The short-side length of the image does not coincide with the long-side length of the monitor screen. Hence, so-called letterbox display is performed by performing a process of adding black bands 1201 to the left and right sides of the image to make the horizontal and vertical sizes of the image coincide with those of the monitor screen.

FIG. 13 is a view showing a state in which the vertically-oriented image is displayed in the vertically-oriented attitude. In the example shown in FIG. 13, since the horizontal and vertical sizes of the image coincide with those of the monitor screen, the image is displayed so as to fill the monitor screen. FIG. 14 is a view showing a state in which the horizontally-oriented image is displayed in the vertically-oriented attitude. In the example shown in FIG. 14, the horizontally-oriented image which is rotated and reduced is letterbox-displayed, as in the example shown in FIG. 12.

As described above, the top and bottom, or upwards and downwards, direction of the display image can be changed in accordance with the equipment or tool attitude at the time of playback using the attitude-at-photographing information added to the image. Note that the above-described photographing attitude switching and the image playback method using attitude-at-photographing information are applicable not only to a still image but also to a moving image, or not only to a digital camera but also to a video camera, a portable telephone, and the like. The following related arts are disclosed as techniques of rotating a display image correspondingly to the equipment or tool attitude.

Japanese Patent Application Laid-Open No. 2006-166248 discloses a technique capable of switching between a first display attitude in which the longitudinal direction of an image becomes perpendicular to the longitudinal direction of the display screen and a second display attitude in which the longitudinal direction of an image almost coincides with the longitudinal direction of the display screen, when displaying a horizontal image on a horizontally-long display screen. According to this technique, switching between the first and second display attitudes is done in accordance with the operation mode or attitude of the equipment or tool.

Japanese Patent Application Laid-Open No. 2008-066967 discloses a technique of performing a rotation process of an image based on the attitude information of an apparatus during the stop of moving image data playback, and displaying the image. In this technique, after the start of playback or after the elapse of a predetermined time from the start of playback, the image is displayed in the immediately preceding image display direction independently of the attitude of the apparatus, and then the rotation process is not performed.

When magnifying an image so that the entire image fits in the display area, a horizontally-oriented image can be displayed larger by making its top and bottom direction coincide with the short-length direction of the display as shown in FIG. 11, than by making the top and bottom direction coincide with the longitudinal direction as shown in FIG. 14. On the other hand, a vertically-oriented image can be displayed larger by making its top and bottom direction coincide with the longitudinal direction of the display as shown in FIG. 13, than by making the top and bottom direction coincide with the short-length direction as shown in FIG. 12. In order to expand the view of an image, the user preferably rotates the playback apparatus to the attitude in FIG. 11 or 13. However, if the display time of a moving image is only several sec, playback may end during changing the apparatus attitude in accordance with the image, and the user may be unable to sufficiently view the image.

In general, an image is preferably viewed while being displayed on the entire monitor screen regardless of whether it is a moving image or a still image. This tendency becomes more conspicuous in portable equipments and tools in which the monitor screen size is limited as the equipment or tool is downsized. It is therefore recommended to view each of a horizontally-oriented image and a vertically-oriented image in an optimum attitude, as shown in FIGS. 11 and 13.

When viewing a still image, the contents do not change. However, a moving image has a time base, and its contents change in accordance with the movement of the object along with the elapse of time. In addition, the time of length of a moving image variously changes for each file. Some moving images may end in several sec, and some may take several tens of minutes to play back. For example, when sequentially switching and displaying a plurality of images for slide show display or the like, the time to display one image can arbitrarily be determined for a still image. However, a moving image needs to be played back along the actual time base except in special playback such as slow motion or fast-forward.

As described above, a moving image is restricted by the time base in playback. For this reason, when continuously playing back a moving image group including both horizontal moving images and vertical moving images, the apparatus attitude needs to be frequently changed if the times of the respective moving images are short. Especially, a moving image whose display time is several sec ends during changing the apparatus attitude in accordance with the image, and the playback of the next moving image starts without allowing the user to sufficiently view the image. When horizontal and vertical moving images having short display times are irregularly arranged, the operation of confirming the display image and rotating the apparatus to make its attitude coincide with the image cannot be performed sufficiently without delay because the moving image switches at a high speed.

In addition, the apparatus attitude may change during moving image playback. For example, when the user changes the hand to hold a portable equipment or tool, or stands up or sits down, the apparatus attitude may change against his/her intention. If the apparatus attitude is monitored using a sensor, and the display image is changed by rotation or enlargement/reduction, as described above, the image responds to the change in the apparatus attitude against user's intention. This may cause an unintentional change in the orientation or size of the display image, and the user readily misses the object image of interest. If the display time of the moving image is short, playback of the next moving image may start before the user finds the object image.

SUMMARY OF THE INVENTION

The present invention has been made in consideration of the above-described problems, and aspects and embodiments provide a display apparatus capable of rotating and displaying an image in accordance with an attitude to display the image easier to view.

According to certain aspects and embodiments of the present invention, a display apparatus including a display unit, arranged to playback a sequence of images, comprises: a detection configured to detect an attitude of the display apparatus or the display unit; a control unit configured to control the display unit to pause playback of the sequence of images, if the detected attitude of the display apparatus is not substantially aligned with the orientation of an image to be displayed.

Further features of the present invention will become apparent from the following description of exemplary embodiments with reference to the attached drawings.

BRIEF DESCRIPTION OF THE DRAWINGS

FIG. 6 is comprised of FIGS. 6A and 6B, showing a flowchart showing an example of the procedure of a display operation when playing back a moving image in the second embodiment of the present invention.

FIGS. 18A and 18B are views showing a state in which the attitude of the digital camera is changed in accordance with the top and bottom icon.

FIG. 21 is a view showing a state in which the attitude of the digital camera is changed in a state in which the rotation-impossibility icon is added to the rotated and reduced image.

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment.

The embodiments of the present invention will now be described with reference to the accompanying drawings.

First Embodiment

The arrangement of a digital camera will be described first with reference to FIGS. 1A, 1B, and 2 as an example of a moving image playback apparatus according to this embodiment.

Figure 1A:
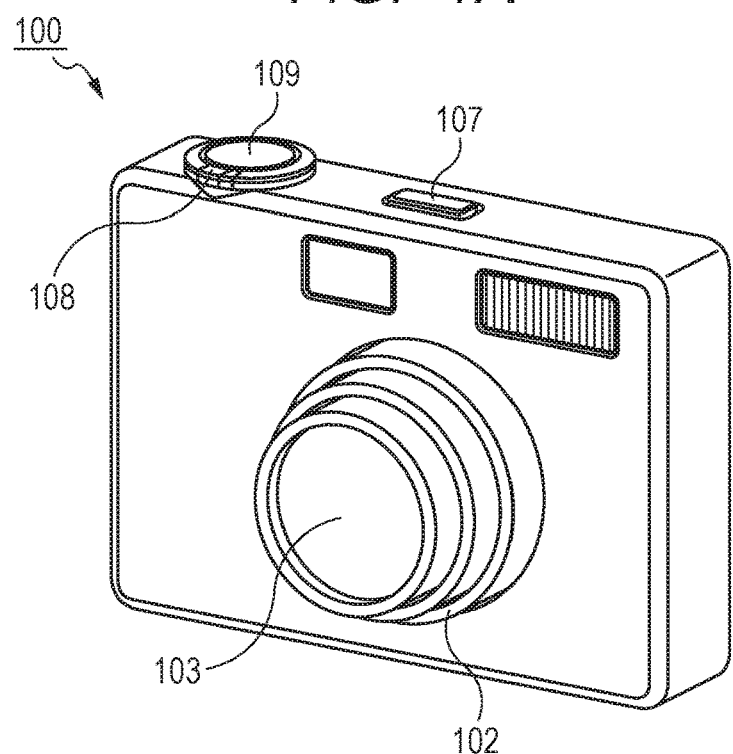
FIGS. 1A and 1B are perspective views showing an example of the outer appearance of a digital camera according to an embodiment of the present invention.
Figure 1B:
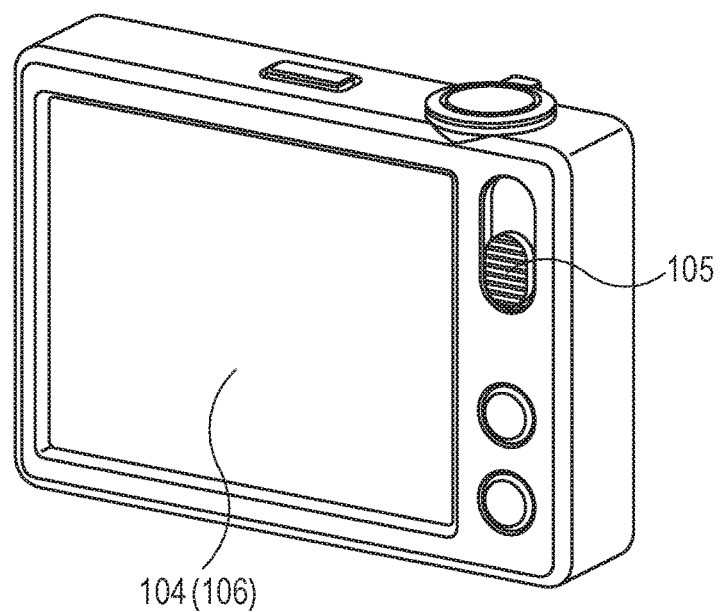

FIGS. 1A and 1B are perspective views showing an example of the outer appearance of a digital camera 100 according to this embodiment. FIG. 1A is a perspective view showing the front side of the digital camera 100, and FIG. 1B is a perspective view showing the back side of the digital camera 100. FIG. 2 is a block diagram showing an example of the internal arrangement of the digital camera 100 according to this embodiment.

As shown in FIG. 1A, the digital camera 100 has a rectangular parallelepiped body frame. A lens barrel unit 102 is elongated from one surface of the body frame (the front surface of the digital camera 100). The lens barrel unit 102 is formed from a plurality of cylindrical members which are expanded and contracted all together by a cam mechanism (not shown) driven by a motor 201 shown in FIG. 2. The lens barrel unit 102 incorporates a plurality of lenses. A so-called optical zoom mechanism is constituted which can freely change the focal length by moving some of the lenses constituting the imaging optical system by expansion and contraction of the lens barrel unit 102. In addition, the digital camera employs a collapsible lens which protects a lens surface 103 increases the portability in a non-photographing state by, for example, contracting the lens barrel unit 102, storing it in the body frame, and covering the lens barrel unit 102 by a retractable barrier member (not shown). Optical support equipments such as a flash light emitting unit and a fill light emitting unit for AF (Auto Focus) (neither are shown) are arranged on the front surface of the digital camera 100.

A power supply switch 107 that turns on/off the power supply, a zoom lever 108 that drives the zoom mechanism and manipulates the photographing image angle, and a release switch 109 that instructs to start or stop image photographing are arranged on the top surface of the digital camera 100.

On the other hand, as shown in FIG. 1B, an LCD monitor 104 that displays an image as a display unit, and a mode change-over switch 105 that switches the operation mode of the digital camera 100 are arranged on the back surface of the digital camera 100, that is, the surface opposite to the lens arrangement surface. In addition, a touch panel device 106 is arranged while being overlaid on the LCD monitor 104.

Figure 2:
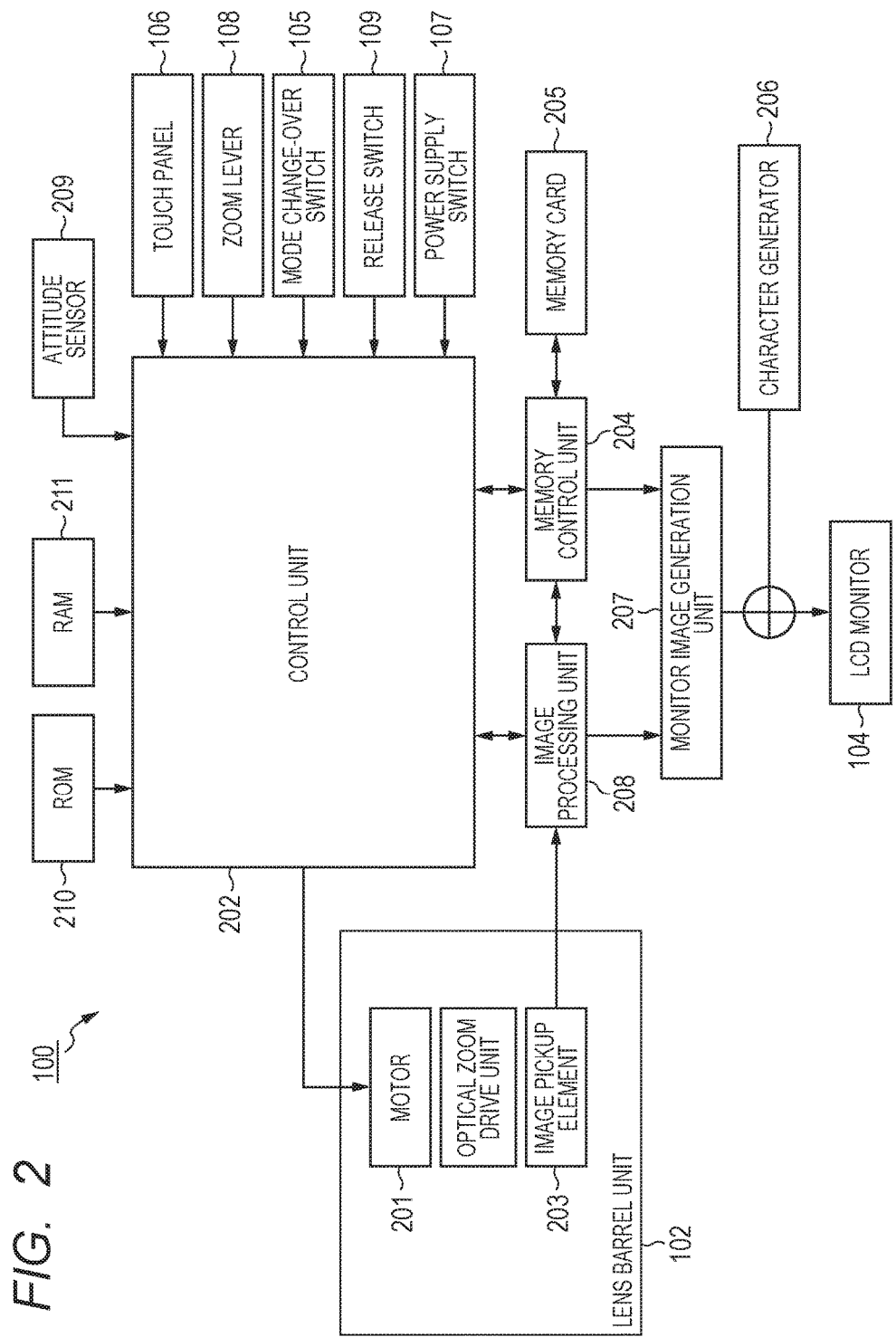
FIG. 2 is a block diagram showing an example of the internal arrangement of the digital camera according to the embodiment of the present invention.

Referring to FIG. 2, when the user operates each operation member of the digital camera 100, an input signal is input to a control unit 202. The control unit 202 drives and controls each unit of the digital camera 100 in accordance with the input signal. For example, when the power supply switch 107 is operated, a predetermined input signal is input to the control unit 202, and the control unit 202 is activated. The control unit 202 detects the state of the mode change-over switch 105, and controls each unit in accordance with the set operation mode. The operation modes include a still image photographing mode, a moving image photographing mode, and an image playback mode.

When the mode change-over switch 105 is set in the still image photographing mode or the moving image photographing mode, the control unit 202 drives and controls the motor 201 and expands the lens barrel unit 102 upon power-on. The control unit 202 also activates the camera unit including an image pickup element 203 and sets a photographing standby state. A monitor image generation unit 207 displays an object image captured by the camera unit on the LCD monitor 104 as a monitor image in real time via an image processing unit 208.

The control unit 202 also detects, via a memory control unit 204, the recording state of a memory card 205 that is a recording medium. Then, control is performed to superimpose the detected remaining capacity and a photographable image amount calculated based on the current photographing mode on the monitor image generated by the monitor image generation unit 207 as a character generated by a character generator 206. The photographable image amount means the number of remaining frames of photographable images in the still image photographing mode or the remaining time of photographable moving images in the moving image photographing mode. Control is also performed to superimpose a remaining usable time calculated from the remaining capacity of a battery (not shown) that is the power supply on the monitor image as a character. The monitor image generation unit 207 performs an image rotation/reduction process to be described later.

When the release switch 109 is operated, image data obtained via the image pickup element 203 is converted into a predetermined image format by the image processing unit 208 and recorded in the memory card 205 via the memory control unit 204. The predetermined image format means a still image format such as JPEG in the still image photographing mode or a moving image format such as MPEG or AVI in the moving image photographing mode. The image data is saved in the memory card 205 as a separate file by every operation of the release switch 109 and managed with a given unique file name such as a serial number.

On the other hand, when the mode change-over switch 105 is set in the playback mode, the lens barrel unit 102 is stored as described above. The control unit 202 accesses the memory control unit 204 and reads out image data from the memory card 205. The readout image data is expanded into a predetermined image format by the monitor image generation unit 207 in accordance with the image type, a still image or a moving image, and displayed on the LCD monitor 104. After that, the image data recorded in the memory card 205 is sequentially read out and displayed on the LCD monitor 104 in accordance with the user operation or the time series at the time of photographing.

The LCD monitor 104 displays an operation icon generated by the character generator 206 in accordance with the operation mode of the digital camera 100. The user can visually recognize the operation icon via the touch panel device 106. When the user touches the operation icon displayed on the LCD monitor 104 via the touch panel device 106 by a finger or the like, the touch panel device 106 sends a signal corresponding to the position where the user touches to the control unit 202. When the signal is output from the touch panel device 106, the control unit 202 converts the position where the user touches into a plane coordinate value on the LCD monitor 104, and executes a function associated with the operation icon displayed at the coordinates. In the playback mode, operation functions such as the start and stop of playback and jump to the next file are provided.

Upon power-off, the control unit 202 instructs the memory control unit 204 to perform a termination process. The memory control unit 204 disconnects the memory card 205 and allows the user to remove it. Note that if there is data that is being recorded in the memory card 205, the disconnection process is performed after completion of the recording. In a case where the lens barrel unit 102 is expanded, it is stored, and the barrier is retracted interlockingly with the storage of the lens unit. In addition, the LCD monitor 104 is turned off, and power supply to each unit is cut, thus ending the power off process.

Figure 9:
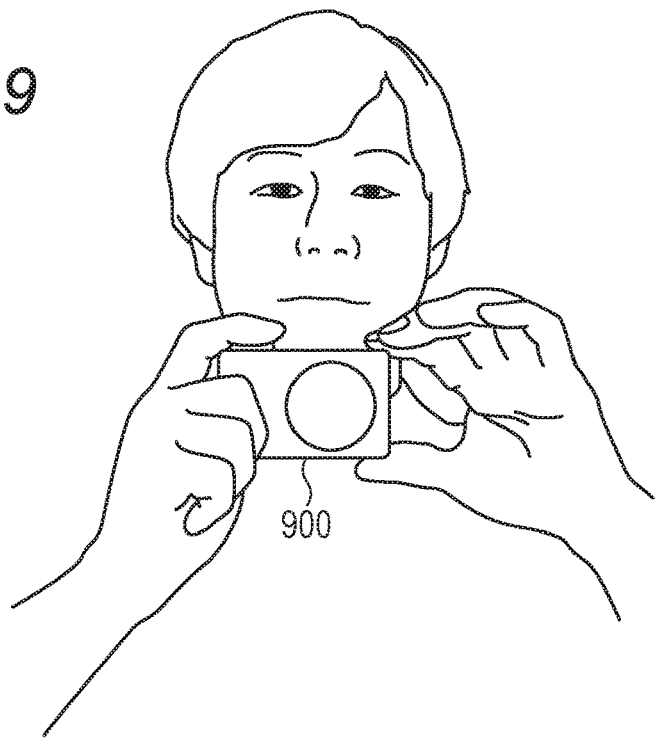
FIG. 9 is a view showing an example of a photographing attitude when photographing a horizontal image.
Figure 10:
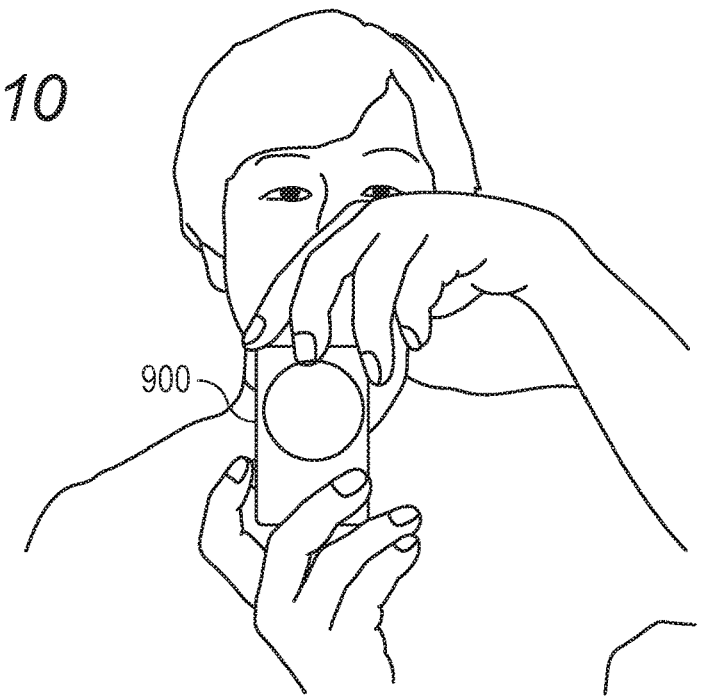
FIG. 10 is a view showing an example of a photographing attitude when photographing a vertical image.
Figure 11:
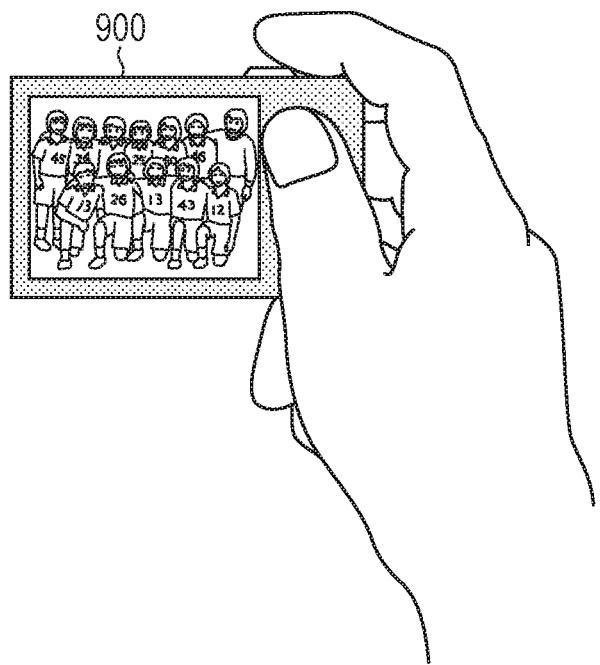
FIG. 11 is a view showing a state in which a horizontally-oriented image is displayed in a horizontally-oriented attitude.
Figure 12:
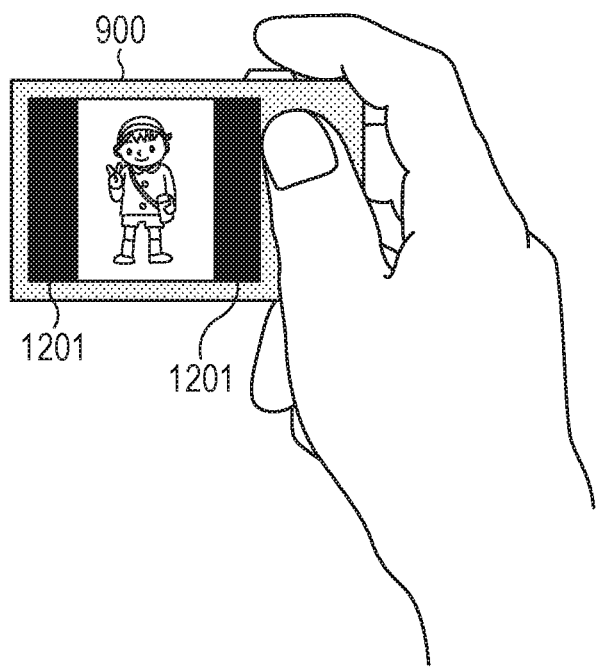
FIG. 12 is a view showing a state in which a vertically-oriented image is displayed in the horizontally-oriented attitude.
Figure 13:
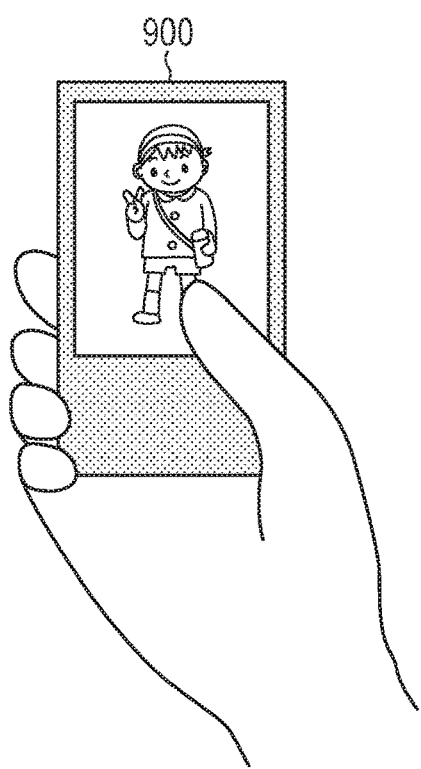
FIG. 13 is a view showing a state in which the vertically-oriented image is displayed in a vertically-oriented attitude.
Figure 14:
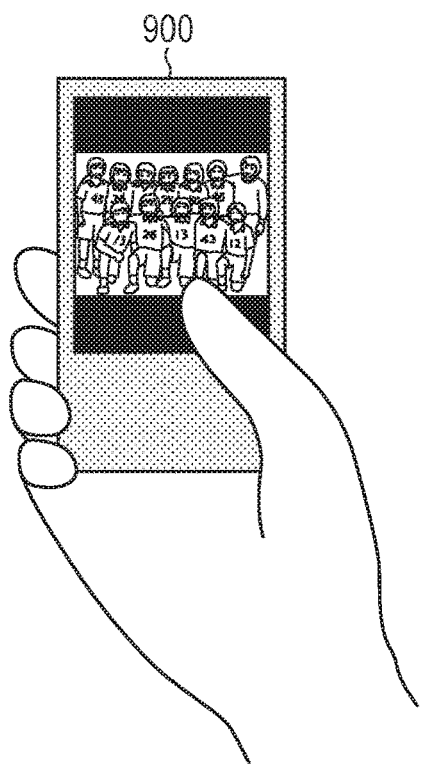
FIG. 14 is a view showing a state in which the horizontally-oriented image displayed in the vertically-oriented attitude.

The digital camera 100 according to this embodiment includes an attitude sensor 209 that detects the attitude of the digital camera 100 at a predetermined time interval. As the attitude of the digital camera 100, which one of the four side surfaces of the body frame with respect to the photographing optical axis of the digital camera 100 as the center faces upward in the gravitational direction is detected. That is, the four attitudes including the horizontally-oriented attitude shown in FIG. 9, the vertically-oriented attitude shown in FIG. 10, and the attitudes obtained by rotating the above-described attitudes by 180° about the photographing optical axis are detected and discriminated. The attitude sensor 209 is a sensor capable of discriminating the attitude of the digital camera 100 based on the gravitational direction, and is formed from an acceleration sensor or a vertical and horizontal orientation detection sensor.

In the still image photographing mode or the moving image photographing mode, the attitude information of the digital camera 100 detected by the attitude sensor 209 is added to image data obtained by photographing as a flag. The photographing attitude of the digital camera 100 decides the orientation of the photographed image. Hence, in other words, the attitude information added to the image data represents the top and bottom direction of the photographed image, for example.

The digital camera 100 also includes a ROM 210 that stores programs to cause the digital camera to execute processes to be described below, and a RAM 211 used to develop the programs.

The digital camera 100 according to this embodiment causes the control unit 202 to compare the attitude information added to image data with the current attitude information of the digital camera 100 and change the image display method on the LCD monitor 104.

FIGS. 3A to 3D are views showing examples of display on the LCD monitor 104 when playing back a moving image in this embodiment.

Figure 3A:
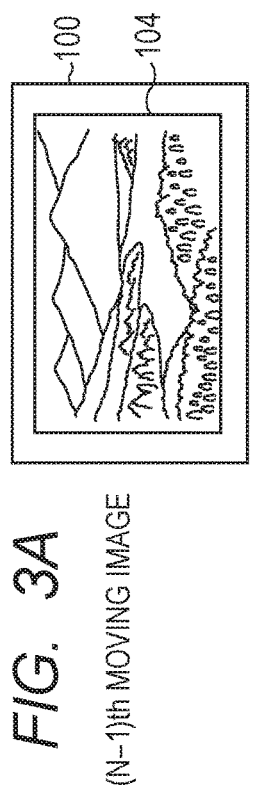
FIGS. 3A, 3B, 3C and 3D are views showing examples of display on an LCD monitor when playing back a moving image.

FIG. 3A shows a display example when playing back an (N−1)th moving image. The digital camera 100 is set in the horizontally-oriented attitude and displays a horizontally-oriented moving image.

Figure 3B:
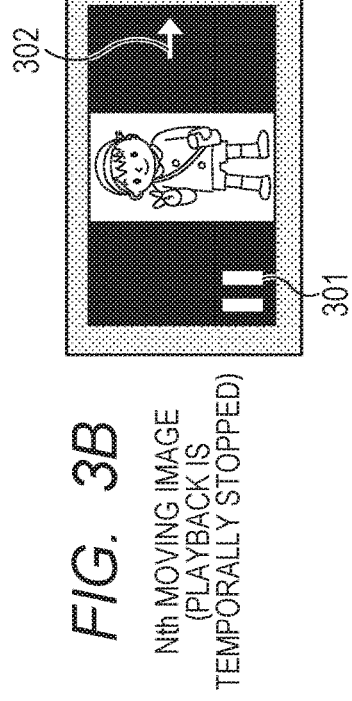
Figure 3C:
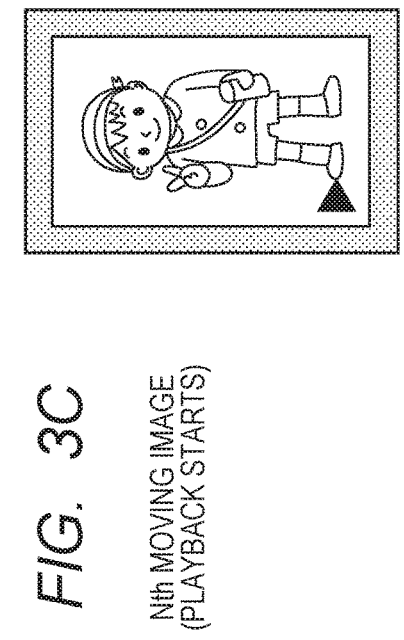

When playback of the (N−1)th moving image that is the first moving image ends, playback of an Nth moving image that is the second moving image starts. If the Nth moving image is a vertically-oriented image, it does not coincide with the attitude of the digital camera 100. Hence, as shown in FIG. 3B, the first frame image of the Nth moving image rotated and reduced in accordance with the attitude of the digital camera 100 is displayed, and the moving image playback is temporarily stopped. At this time, a temporary stop icon 301 representing a temporarily stopping state and an orientation icon 302 representing the attitude of the digital camera 100 upon photographing the moving image are generated by the character generator 206 and superimposed on the image by the monitor image generation unit 207. As shown in FIG. 3C, when the digital camera 100 is rotated by 90°, the moving image playback starts. Note that the orientation icon 302 has an arrow shape and indicates the side of the digital camera 100, which is the upper side at the time of photographing.

Figure 3D:
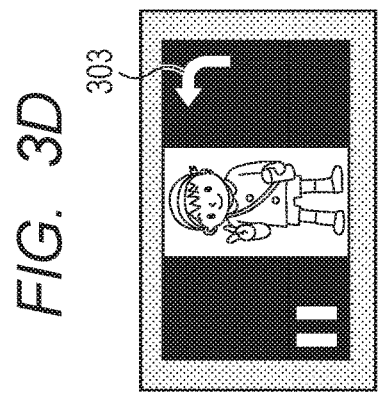

As another example of the orientation icon, an icon 303 shown in FIG. 3D may be used, which indicates the direction in which the body of the digital camera 100 should be rotated to make it coincide with the top and bottom direction of the moving image.

A display operation when playing back a moving image by the digital camera 100 will be described next with reference to the flowchart shown in FIG. 4.

Figure 4:
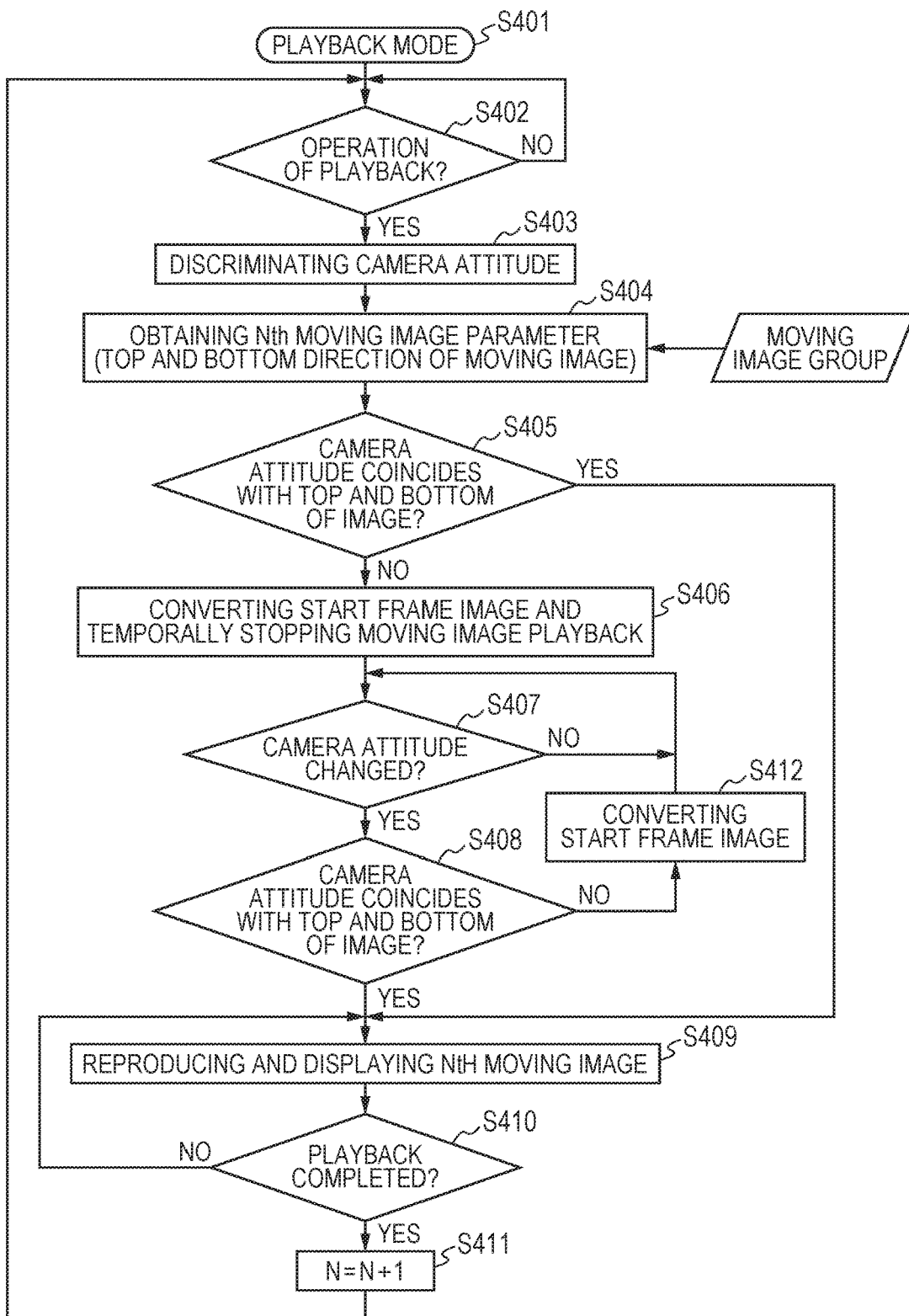
FIG. 4 is a flowchart showing an example of the procedure of a display operation when playing back a moving image in the first embodiment of the present invention.

FIG. 4 is a flowchart showing an example of the procedure of the display operation when playing back a moving image in this embodiment. Note that each process shown in FIG. 4 is performed under the control of the control unit 202, and more specifically, a program stored in the ROM 210 is developed on the RAM 211, and a process according to the program is thus executed.

First, when the mode change-over switch 105 is set in the image playback mode, or the digital camera is powered on in the image playback mode, the process starts (step S401). The process waits until a playback start operation by the user is detected (step S402). Upon detecting the playback start operation by the user, the output of the attitude sensor 209 is monitored at a predetermined time interval, and the current attitude of the digital camera 100 is discriminated (step S403). Note that since the LCD monitor 104 is integrated with the digital camera 100 according to this embodiment, the attitude of the digital camera 100 can directly be considered as the attitude of the LCD monitor 104.

Moving image data that is the first playback target according to the user operation is read out from the data recorded in the memory card 205. At this time, attitude-at-photographing information added to the moving image data, that is, information representing the top and bottom direction of the moving image is also obtained (step S404). Note that if the information representing the top and bottom direction is not added to the moving image data, the display direction of a case where the moving image is displayed without being rotated is regarded as the top and bottom direction of the moving image.

Next, the attitude of the digital camera 100 discriminated in step S403 is compared with the top and bottom direction of the moving image obtained in step S404 (step S405). If the attitude of the digital camera 100 does not coincide with the top and bottom direction of the moving image as the result of comparison, the monitor image generation unit 207 performs a rotation process of the first frame image of the moving image so that the top and bottom of the image coincides with the current attitude of the digital camera 100. If the horizontal and vertical sizes of the LCD monitor 104 do not coincide with those of the moving image, letterbox display is performed in which the image is reduced such that its long-side length coincides with the short-side length of the monitor screen. In this display state, the playback process is temporarily stopped. At this time, the icon representing the temporary stop state and the orientation icon representing the attitude of the digital camera 100 at the time of photographing the moving image are generated by the character generator 206 and superimposed on the image by the monitor image generation unit 207 (step S406).

After that, the output of the attitude sensor 209 is monitored at a predetermined time interval, and the process waits until the attitude of the digital camera 100 changes (step S407). Note that if a moving image playback instruction operation is received from the user when the attitude of the digital camera 100 remains unchanged, playback of the moving image may start in the rotated and reduced state.

Figure 5A:
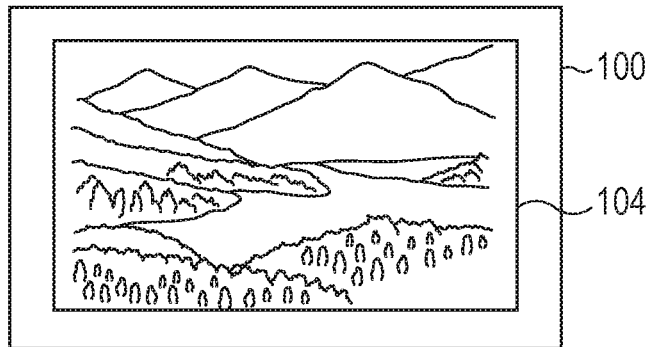
FIGS. 5A, 5B and 5C are views showing a state in which moving image playback is temporarily stopped when playing back the next moving image.
Figure 5B:
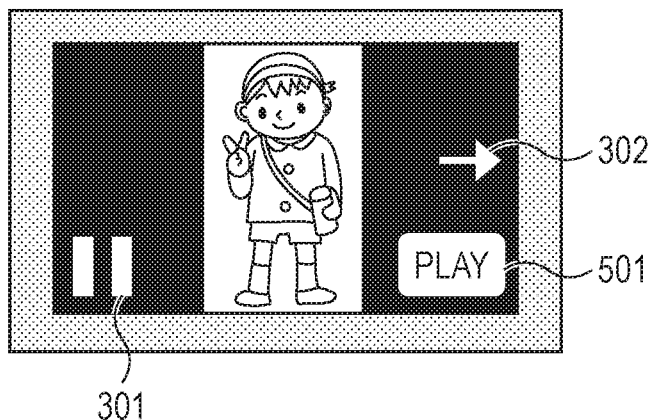
Figure 5C:
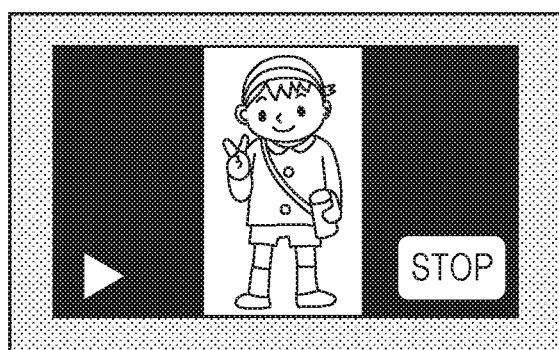

When display of the (N−1)th moving image shown in FIG. 5A ends, then, in step S406, the first frame image of the Nth moving image as shown in FIG. 5B is displayed in a state in which the moving image playback is temporarily stopped. At this time, a playback icon 501 is displayed together with the temporary stop icon 301 and the orientation icon 302. When the user touches the playback icon 501, the touch panel device 106 detects the touching. The temporarily stopping state is discontinued, and the moving image playback starts. In this case, since the attitude of the digital camera 100 does not coincide with the top and bottom direction of the moving image, the monitor image generation unit 207 performs the rotation/reduction process of the moving image to generate the display image, like the first frame image, as shown in FIG. 5C.

Upon detecting a change in the attitude of the digital camera 100 in step S407, the current attitude of the digital camera 100 is compared with the top and bottom direction of the moving image again (step S408). If the current attitude of the digital camera 100 does not coincide with the top and bottom direction of the moving image as the result of comparison, the first frame image of the moving image is rotated, reduced, and displayed in accordance with the current attitude of the digital camera 100 (step S412), and the temporary moving image playback stopping state is maintained.

On the other hand, if the current attitude of the digital camera 100 coincides with the top and bottom direction of the moving image as the result of comparison in step S408, that is, if a state in which the Nth moving image can directly be displayed is obtained, playback starts (step S409). Note that even when the top and bottom direction of the moving image is reversed, playback can start because the vertical and horizontal orientations of the moving image coincide with those of the digital camera 100, that is, those of the LCD screen. In this case, if the moving image is directly displayed, the top and bottom direction is reversed. Hence, the monitor image generation unit 207 generates an image by performing a 180°-rotation process of the moving image.

On the other hand, if the current attitude of the digital camera 100 coincides with the top and bottom direction of the moving image as the result of comparison in step S405 as well, the moving image is directly displayed by the monitor image generation unit 207 (step S409). It is discriminated whether the moving image playback is completed (step S410). If the playback is not completed as the result of discrimination, the process returns to step S409 to continue the moving image playback. On the other hand, if the playback is completed as the result of discrimination in step S410, the process advances to a preparation state to play back the next moving image (step S411) and returns to step S402.

As described above, in the digital camera 100 according to this embodiment, when the attitude of the digital camera 100 does not coincide with the top and bottom direction of the moving image, the moving image playback is temporarily stopped. In addition, display is arranged to prompt the user to make the attitude of the digital camera 100 coincide with the top and bottom direction of the moving image. When the top and bottom direction coincides with the attitude of the digital camera 100, playback starts. This prevents the moving image playback from progressing during the time when the user is changing its apparatus holding manner and the user from missing the moving image period until the end of changing the apparatus holding manner. Hence, the user can view the moving image in an appropriate attitude from the beginning. In addition, the moving image rotation process according to the attitude of the playback apparatus is performed not halfway through the playback of the moving image but during a pause in the moving image. This can prevent the moving image from being rotated and becoming difficult to view halfway through the playback of the moving image. Furthermore, even if moving images of the horizontal screen and moving images of the vertical screen are irregularly arranged, the user can calmly make the digital camera attitude coincide with the top and bottom direction of the image. Moreover, since the playback starts when the digital camera attitude coincides with the top and bottom direction of the moving image, the image can be viewed in an optimum attitude, and the playback start operation is unnecessary, resulting in higher convenience.

Note that in this embodiment, a moving image photographed by the digital camera 100 has been exemplified. On the other hand, the embodiment can also be applied to moving image data loaded from an external equipment, moving image data downloaded from the Internet, or moving image data picked up by an external image pickup apparatus and received almost in real time.

Second Embodiment

The second embodiment of the present invention will be described next. Note that the arrangement of a digital camera according to this embodiment is the same as that shown in FIGS. 1A, 1B, and 2 of the first embodiment, and a description thereof will be omitted.

FIG. 6 is comprised of FIGS. 6A and 6B, showing a flowchart showing an example of the procedure of a display operation when playing back a moving image in this embodiment. Note that each process shown in FIGS. 6A and 6B is performed under the control of a control unit 202, and more specifically, a program stored in a ROM 210 is developed on a RAM 211, and a process according to the program is thus executed. The same step numbers as in the flowchart of FIG. 4 indicate the same operation portions in the flowchart of FIGS. 6A and 6B. These processes are the same as in the first embodiment, and a description thereof will be omitted.

When the process of step S404 ends, the top and bottom direction of the Nth moving image that is the playback target and that of the (N−1)th moving image played back previously are compared in step S601. If the top and bottom direction of the Nth moving image is the same as that of the (N−1)th moving image as the result of comparison, the process advances to step S602. The attitude of a digital camera 100 at the playback end time point of the (N−1)th moving image, which is stored in step S609 to be described later, is compared with the current attitude of the digital camera 100 discriminated in step S403 (step S602). If the attitudes coincide with each other as the result of comparison, the current attitude of the digital camera 100 is further compared with the top and bottom direction of the Nth moving image obtained in step S404 (step S603).

Figure 7A:
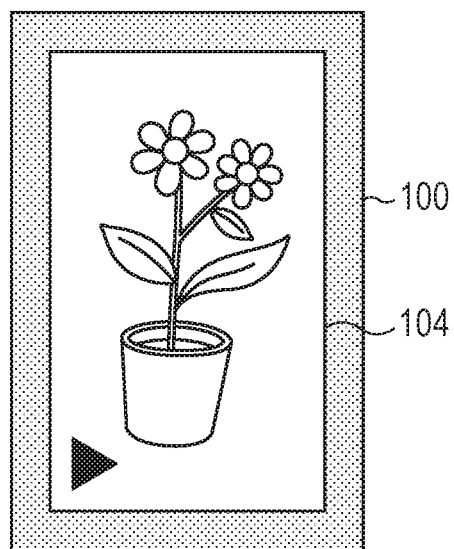
FIGS. 7A and 7B are views showing a state in which the next moving image is played back without temporary stop.
Figure 7B:
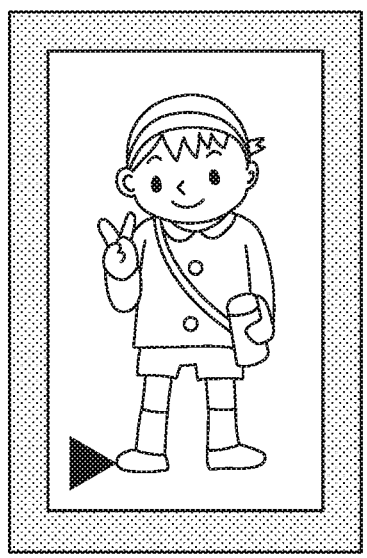

If the current attitude of the digital camera 100 coincides with the top and bottom direction of the Nth moving image as the result of comparison in step S603, the moving image is directly played back and displayed (step S604). That is, it is found by the process up to this point that the immediately preceding moving image was displayed in the state in which the top and bottom direction of the moving image coincided with the attitude of the digital camera 100. For this reason, it can be determined that the current moving image can also be played back in a similar manner without any problem. FIGS. 7A and 7B show a state in which the moving image is played back and displayed without temporary stop.

Figure 8A:
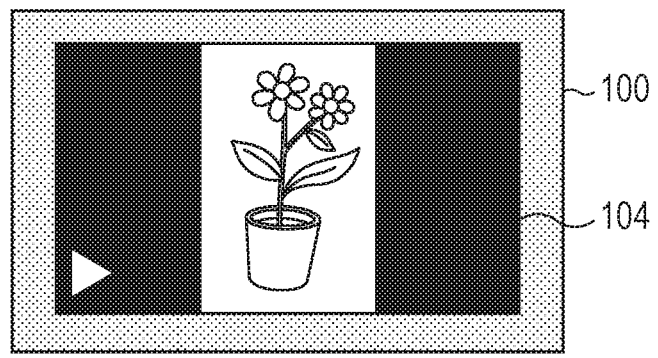
FIGS. 8A and 8B are views showing a state in which the next moving image is rotated, reduced, and displayed without temporary stop.
Figure 8B:
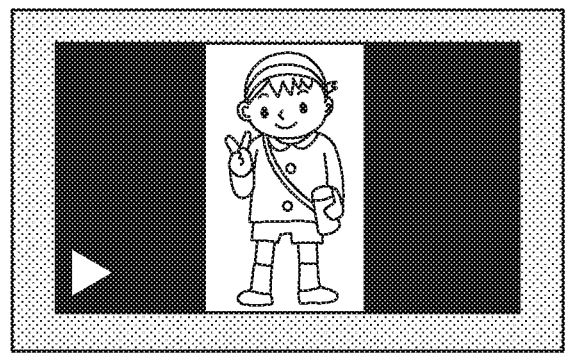

On the other hand, if the current attitude of the digital camera 100 does not coincide with the top and bottom direction of the Nth moving image as the result of comparison in step S603, the process returns to step S607 to be described later. In this case, it is found by the process up to this point that the immediately preceding moving image is displayed in the state in which the top and bottom direction of the moving image did not coincide with the attitude of the digital camera 100, that is, a moving image rotated and reduced as shown in FIG. 8A is displayed. For this reason, it can be determined that the user accepts displaying a rotated and reduced moving image. Hence, a monitor image generation unit 207 performs a rotation/reduction process of the Nth moving image like the immediately preceding moving image (step S607). The rotated and reduced moving image is directly displayed without temporary stop (step S604). FIGS. 8A and 8B show a state in which the moving image is played back and displayed without temporary stop.

After that, the output of an attitude sensor 209 is monitored, and it is discriminated whether the attitude of the digital camera 100 is changed (step S605). If the attitude is not changed as the result of discrimination, the process advances to step S606. If the attitude has changed, the monitor image generation unit 207 continues the moving image playback while performing a rotation/magnification-change process of the moving image in accordance with the changed attitude (step S608). It is discriminated whether the moving image playback is completed (step S606). If the playback is not completed as the result of discrimination, the process returns to step S605 to continue the moving image playback. On the other hand, if the playback is completed as the result of discrimination in step S606, the output of the attitude sensor 209 at that time is monitored, and attitude information at the playback end time point is stored in the RAM 211 (step S609). The process advances to a preparation state to play back the next moving image (step S411) and returns to step S402.

If the top and bottom direction of the current (Nth) moving image does not coincide with the top and bottom direction of the immediately preceding ((N−1)th) moving image as the result of comparison in step S601, the process advances to step S405. Note that when playing back the first moving image, the process advances from step S601 to step S405 because the immediately preceding moving image does not exist. Also, if the attitude of the digital camera 100 at the playback end time point of the immediately preceding moving image does not coincide with the current attitude of the digital camera 100, as the result of comparison in step S602, the process advances to step S405.

If the top and bottom direction of the current (Nth) moving image does not coincide with the top and bottom direction of the immediately preceding ((N−1)th) moving image in the comparison of step S601, it is difficult to determine whether to inherit the playback state of the immediately preceding moving image. Hence, the playback is temporarily stopped, and the process returns to the operation of confirming the user's intention, as in the first embodiment.

If the attitude of the digital camera 100 at the playback end time point of the immediately preceding moving image does not coincide with the current attitude of the digital camera 100 in the comparison of step S602, it indicates that the attitude is changed after completion of the playback of the immediately preceding moving image. It is therefore impossible to determine whether to inherit the playback state of the immediately preceding moving image. Hence, the playback is temporarily stopped, and the process returns to the operation of confirming the user's intention, as in the first embodiment.

As described above, it can be determined whether the immediately preceding moving image may be displayed after the rotation/reduction process. If the top and bottom direction of the current moving image is the same as that of the immediately preceding moving image, the playback process is continued by displaying the rotated and reduced moving image without temporary stop of the playback. Since the playback is continued without temporary stop, the cumbersomeness can further be reduced as compared to the first embodiment.

Third Embodiment

The third embodiment of the present invention will be described next. Note that the arrangement of a digital camera according to this embodiment is the same as that shown in FIGS. 1A, 1B, and 2 of the first embodiment, and a description thereof will be omitted.

A display operation when playing back a moving image by a digital camera 100 will be described with reference to the flowchart shown in FIG. 15.

Figure 15:
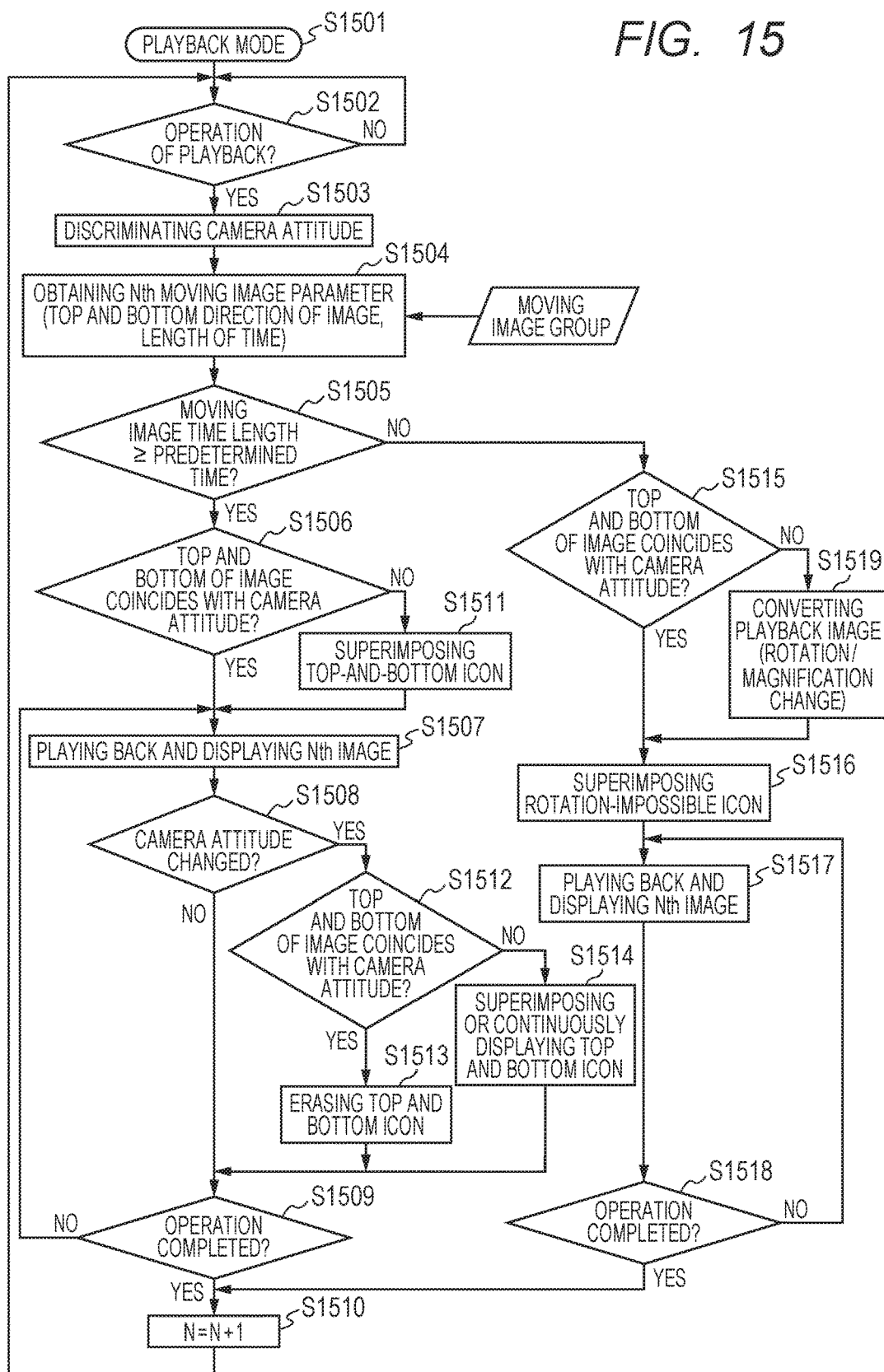
FIG. 15 is a flowchart showing an example of the procedure of a display operation when playing back a moving image in the third embodiment of the present invention.

FIG. 15 is a flowchart showing an example of the procedure of a display operation when playing back a moving image in this embodiment. Note that each process shown in FIG. 15 is performed under the control of a control unit 202, and more specifically, a program stored in a ROM 210 is developed on a RAM 211, and a process according to the program is thus executed.

First, when a mode change-over switch 105 is set in the image playback mode, or the digital camera is powered on in the image playback mode, the process starts (step S1501). The process waits until a playback start operation by the user is detected (step S1502). Upon detecting the playback start operation by the user, the output of an attitude sensor 209 is monitored at a predetermined time interval, and the current attitude of the digital camera 100 is discriminated (step S1503). Note that since an LCD monitor 104 is integrated with the digital camera 100 according to this embodiment, the attitude of the digital camera 100 can be considered as directly the attitude of the LCD monitor 104.

Moving image data that is the first playback target according to the user operation is read out from the data recorded in a memory card 205. At this time, attitude-at-photographing information added to the moving image data, that is, information representing the top and bottom direction of the moving image is also obtained. In addition, information of the time of length of the moving image is obtained (step S1504). It is discriminated whether the obtained time of length of the moving image is equal to or longer than a predetermined time (step S1505). In the following explanation, the predetermined time (threshold) is assumed to be 7 sec. Note that the threshold is not limited to 7 sec, and other values are possible.

Figure 16A:
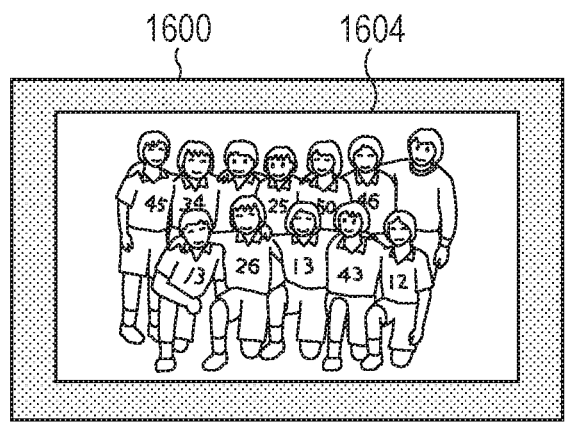
FIGS. 16A and 16B are views showing examples of images displayed on the entire monitor screen.
Figure 16B:

If the time of length of the moving image is equal to or longer than 7 sec as the result of discrimination, the attitude of the digital camera 100 discriminated in step S1503 is compared with the top and bottom direction of the moving image obtained in step S1504 (step S1506). If the current attitude of the digital camera 100 coincides with the top and bottom direction of the moving image as the result of comparison, the moving image is directly displayed without changing its size (step S1507). That is, a monitor image generation unit 207 displays a horizontally-oriented image as shown in FIG. 16A or a vertically-oriented image as shown in FIG. 16B on the entire screen of the LCD monitor 104 in the correct top and bottom direction.

Next, the output of the attitude sensor 209 is monitored at a predetermined time interval, and it is discriminated whether a change in the attitude of the digital camera 100 is detected (step S1508). If the attitude is not changed as the result of discrimination, the playback and display are continued, and it is discriminated whether the moving image playback is completed (step S1509). If the playback is not completed as the result of discrimination, the process returns to step S1507 to continue the moving image playback. On the other hand, if the playback is completed as the result of discrimination in step S1509, the process advances to a preparation state to play back the next moving image (step S1510).

On the other hand, if the attitude of the digital camera 100 does not coincide with the top and bottom direction of the moving image as the result of comparison in step S1506, the process advances to step S1511. The monitor image generation unit 207 superimposes, on the moving image, a character (to be referred to as a top and bottom icon hereinafter) indicating the top and bottom direction of the image, which is generated by a character generator 206 based on information representing the top and bottom direction of the image added to the moving image data (step S1511). Then, playback and display are performed (step S1507).

Figure 17A:
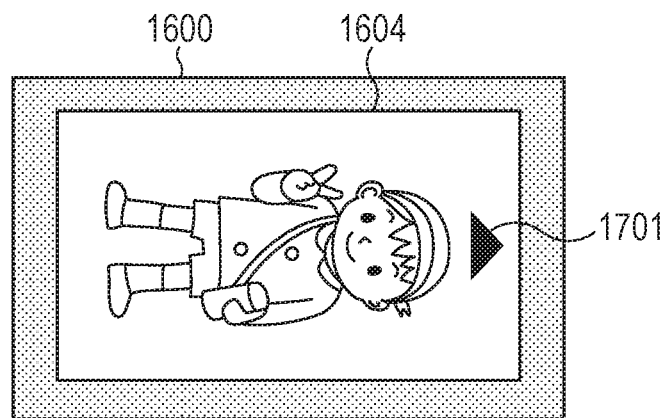
FIGS. 17A and 17B are views showing examples of a display screen in which a top and bottom icon is added to an image.
Figure 17B:
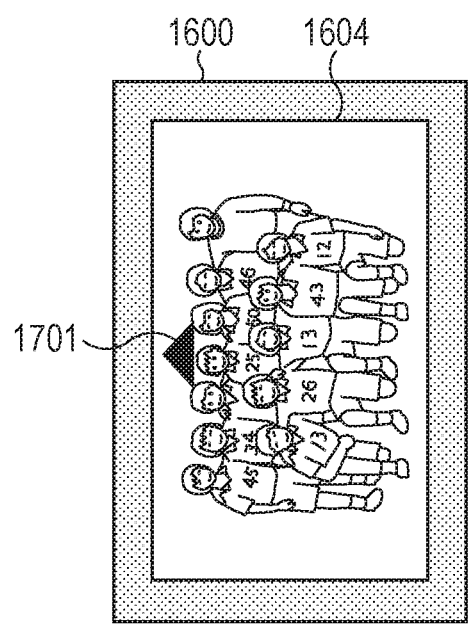

When the top and bottom icon is superimposed, a top and bottom icon 501 is superimposed and displayed in a state in which a vertically-oriented image or a horizontally-oriented image is rotated counterclockwise or clockwise by 90°, as shown in FIGS. 17A and 17B. In the examples shown in FIGS. 17A and 17B, the top and bottom icon 501 has a triangular shape and prompts the user to change the attitude of the digital camera 100 such that the top and bottom icon 501 indicates an upward direction. However, if the attitude of the digital camera 100 is not changed (NO in step S1508), the process advances to step S1509 to maintain the display state.

Upon detecting as the result of discrimination in step S1508 that the attitude of the digital camera 100 is changes during moving image playback, it is discriminated whether the current attitude of the digital camera 100 consequently coincides with the top and bottom direction of the moving image (step S1512). If the attitude of the digital camera 100 coincides with the top and bottom direction of the moving image as the result of discrimination, the displayed top and bottom icon 501 is erased, as shown in FIGS. 18A and 18B.

On the other hand, if the current attitude of the digital camera 100 does not coincide with the top and bottom direction of the moving image as the result of discrimination in step S1512, the process advances to step S1514. If the top and bottom icon is not displayed, the top and bottom icon is newly superimposed and displayed, as in step S1511. If the top and bottom icon is already displayed, the display is continued (step S1514).

Figure 19A:
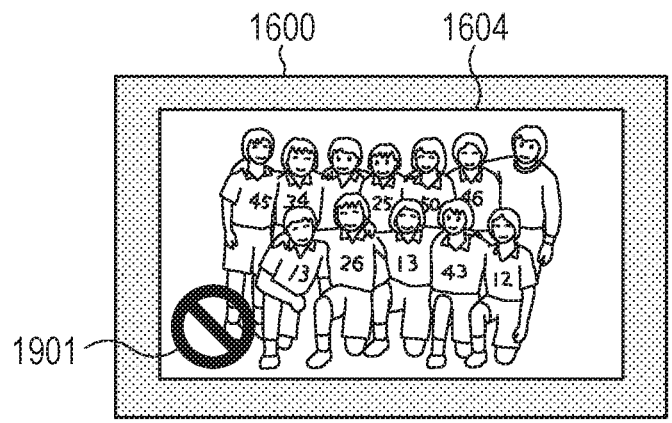
FIGS. 19A and 19B are views showing examples of a display screen in which a rotation-impossibility icon is added to an image displayed on the entire display screen.
Figure 19B:
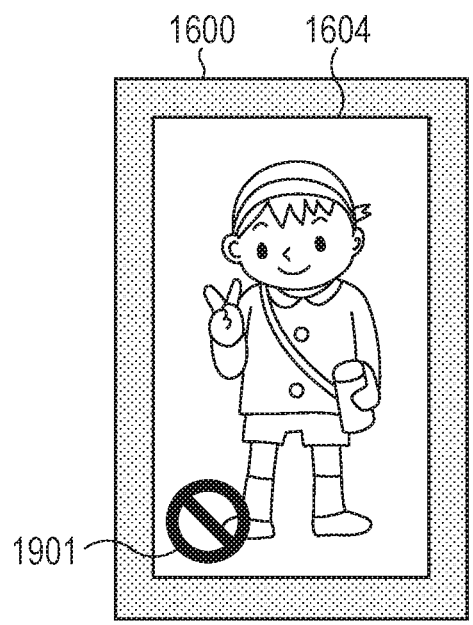

A case will be described in which the time of length of the moving image is shorter than the predetermined time (threshold), that is, shorter than 7 sec as the result of discrimination in step S1505. In this case, the current attitude of the digital camera 100 discriminated in step S1503 is compared with the information representing the top and bottom direction of the moving image obtained in step S1504, and it is discriminated whether the directions coincide with each other (step S1515). If the directions coincide with each other as the result of discrimination, the monitor image generation unit 207 superimposes a rotation-impossibility icon generated by the character generator 206 on the display image (step S1516). When the time of the moving image is short, the rotation-impossibility icon is displayed to call the user's attention not to change the attitude of the digital camera 100 recklessly. For example, as shown in FIGS. 19A and 19B, a rotation-impossibility icon 701 is displayed on the horizontally-oriented image or the vertically-oriented image.

Next, the moving image is displayed as in step S1507 (step S1517), and it is discriminated whether the moving image playback is completed (step S1518). If the playback is not completed as the result of discrimination, the process returns to step S1517 to continue the moving image playback. If the playback is completed, the process advances to a preparation state to play back the next moving image (step S1510).

Figure 20A:
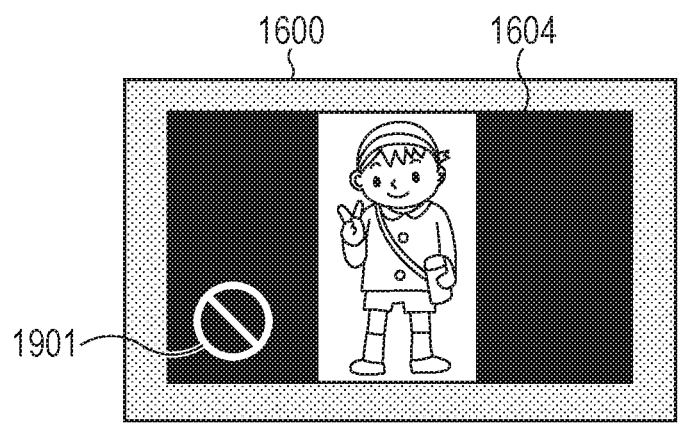
FIGS. 20A and 20B are views showing examples of a display screen in which a rotation-impossibility icon is added to a rotated and reduced image.
Figure 20B:
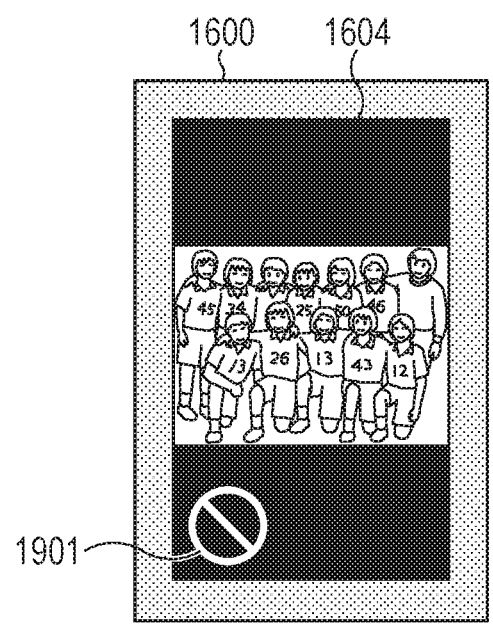

On the other hand, if the directions do not coincide with each other as the result of discrimination in step S1515, the moving image is rotated and reduced (step S1519). Adjustment is thus performed to make the top and bottom direction of the display image coincide with the current attitude of the digital camera 100, and letterbox display is performed. At this time as well, the rotation-impossibility icon is superimposed on the display image in step S1516. The rotation-impossibility icon is displayed to call the user's attention not to change the attitude of the digital camera 100 recklessly, and indicates that the moving image display state is fixed and remains unchanged even if the attitude of the digital camera 100 is changed, as will be described later. As shown in FIGS. 20A and 20B, in the actual screen display state, the rotation-impossibility icon 1901 is superimposed on the vertically-oriented image or horizontally-oriented image having an aspect ratio different from that of the display screen, and letterbox display is performed in accordance with the current attitude of the digital camera 100.

The rotation-impossibility icon is superimposed. In this state, when the vertically-oriented image as shown on the upper side of FIG. 21 is displayed, the digital camera 100 is rotated to change its attitude. Even at this time, the display state of the screen does not change, as shown on the lower side of FIG. 21.

As described above, according to this embodiment, the display method on the LCD monitor 104 is changed in accordance with the time of length of the moving image to be played back. Especially when the time of the moving image is shorter than a predetermined time, and the top and bottom direction of the image does not coincide with the current attitude of the digital camera 100, the moving image is rotated in accordance with the current attitude of the digital camera 100 and displayed. That is, if the time of the moving image is shorter than a predetermined time, higher priority is given to the current attitude of the digital camera 100, and the display image is made to coincide with the attitude of the digital camera by a process such as rotation/reduction. On the other hand, if the time of the moving image is longer than a predetermined time, higher priority is given to the top and bottom direction of the image, and the user is prompted to make the attitude of the digital camera 100 coincide with the top and bottom direction of the image. Since this eliminates the cumbersomeness in making the attitude of the digital camera 100 coincide with the top and bottom direction of the image that frequently changes the top and bottom direction in a short time, the convenience is improved. Note that in this embodiment, the camera unit is not an indispensable component. The embodiment is also applicable to externally loaded moving image data as long as top and bottom information is added to the data in advance.

Note that control of the control unit 202 can be done by one piece of hardware, or a plurality of pieces of hardware may share the process to control the entire apparatus.

The present invention has been described above in detail based on the preferred embodiments. However, the present invention is not limited to these specific embodiments and can incorporate various forms without departing from the scope of the present invention. The above-described embodiments are merely examples of the present invention and can also be combined as needed.

In the above embodiments, an example in which the present invention is applied to a digital camera has been described. However, the present invention is not limited to this example and is applicable to any display control apparatus capable of frequently changing the orientation of the display screen. That is, the present invention is applicable to a portable telephone terminal, a portable image viewer, and the like.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-264541, filed Dec. 3, 2012, and 2012-264622, filed Dec. 3, 2012, which are hereby incorporated by reference herein in their entirety.

What is claimed is:

1. A display apparatus including a display unit, arranged to play back an image sequence, comprising:
   a detection unit configured to detect an attitude of the display apparatus or the display unit;
   an obtaining unit configured to obtain information of a time of length of the image sequence to be played back before the image sequence is to be played back; and
   a control unit configured to control to play back the image sequence in a state that a display size or a display direction of the image sequence is not changed based on the attitude detected by the detection unit, if the time of length of the image sequence obtained by the obtaining unit is greater than or equal to a predetermined time, and to control to play back the image sequence in a state that the display size or the display direction of the image sequence is based on the attitude detected by the detection unit, if the time of length of the image sequence obtained by the obtaining unit is less than the predetermined time.

2. The apparatus according to claim 1, wherein
   the obtaining unit is configured to further obtain information of an orientation of the image sequence, and
   if the time of length of the image sequence obtained by the obtaining unit is less than the predetermined time, the control unit is configured to rotate the image sequence in accordance with a relationship between the information of the orientation and the attitude detected by the detection unit.

3. The apparatus according to claim 1, wherein if the time of length of the image sequence is less than the predetermined time, the control unit is configured not to rotate the image sequence even if the attitude detected by the detection unit changes while the image sequence is displayed on the display unit.

4. The apparatus according to claim 1, wherein if the time of length of the image sequence is less than the predetermined time, the apparatus is configured to display to a user a prompt not to change the attitude of the apparatus and/or the display unit.

5. The apparatus according to claim 1, wherein if the time of length of the image sequence is less than the predetermined time and a top and bottom direction of the image sequence coincides with the attitude detected by the detection unit, the control unit is configured to control to play back the image sequence without changing the display direction which has coincided with the top and bottom direction of the image sequence.

6. The apparatus according to claim 1, wherein if the time of length of the image sequence is greater than or equal to the predetermined time and the attitude detected by the detection unit is different from a top and bottom direction of the image sequence, the control unit is configured to control to display a guide for urging to change the attitude of the apparatus or the display unit.

7. The apparatus according to claim 6, wherein after the guide for urging to change the attitude of the apparatus or the display unit is displayed, if a predetermined change of the attitude detected by the detection unit occurs, the control unit is configured to control not to display the guide.

8. The apparatus according to claim 6, wherein the guide for urging to change the attitude of the apparatus or the display unit includes a guide indicating the top and bottom direction of the image sequence.

9. The apparatus according to claim 1, wherein
if the attitude detected by the detection unit is a horizontally-oriented attitude and a top and bottom direction of the image sequence is vertically long, in a case of the time of length of the image sequence is less than the predetermined time, the control unit is configured to control to play back the image sequence with the display direction of the image sequence changed to the display direction which coincides with the horizontally-oriented attitude, and
if the attitude detected by the detection unit is a vertically-oriented attitude and the top and bottom direction of the image sequence is horizontally long, in a case of the time of length of the image sequence is less than the predetermined time, the control unit is configured to control to play back the image sequence with the display direction of the image sequence changed to the display direction which coincides with the vertically-oriented attitude.

10. The apparatus according to claim 9, wherein the control unit is configured to change the display direction of the image sequence by rotating the image sequence 90° to either a left or a right from the display direction which coincides with the top and bottom direction of the image sequence.

11. The apparatus according to claim 1, wherein in a case where a top and bottom direction of the image sequence to be displayed on the display unit does not coincide with the attitude detected by the detection unit,
the display size of the image sequence to be played back when the time of length of the image sequence obtained by the obtaining unit is greater than or equal to the predetermined time is greater than the display size of the image sequence to be played back when the time of length of the image sequence obtained by the obtaining unit is less than the predetermined time.

12. The apparatus according to claim 1, wherein if the time of length of the image sequence obtained by the obtaining unit is greater than or equal to the predetermined time, the control unit is configured to control to display the image sequence with a same size regardless of whether the attitude detected by the detection unit is a horizontally-oriented attitude or a vertically-oriented attitude.

13. The apparatus according to claim 1, wherein if the time of length of the image sequence obtained by the obtaining unit is less than the predetermined time, the control unit is configured to control to display the image sequence such that the display size of the image sequence to be displayed when the attitude detected by the detection unit is a horizontally-oriented attitude is different from the display size of the image sequence to be displayed when the attitude detected by the detection unit is a vertically-oriented attitude.

14. A control method of playback of an image sequence on a display apparatus including a display unit, comprising:
a detection step of detecting an attitude of the display apparatus or the display unit;
an obtaining step of obtaining information of a time of length of the image sequence to be played back before the image sequence is to be played back; and
a control step of controlling to play back, on the display unit, the image sequence in a state that a display size or a display direction of the image sequence is not changed based on the attitude detected in the detection step, if the time of length of the image sequence obtained in the obtaining step is greater than or equal to a predetermined time, and of controlling to play back the image sequence in a state that the display size or the display direction of the image sequence is based on the attitude detected in the detection step, if the time of length of the image sequence obtained in the obtaining step is less than the predetermined time.

15. A non-transitory computer-readable storage medium storing a program that causes a computer to function as respective units of a display apparatus including a display unit, arranged to play back an image sequence, the respective units being:
a detection unit configured to detect an attitude of the display apparatus or the display unit;
an obtaining unit configured to obtain information of a time of length of the image sequence to be played back before the image sequence is to be played back; and
a control unit configured to control to play back the image sequence in a state that a display size or a display direction of the image sequence is not changed based on the attitude detected by the detection unit, if the time of length of the image sequence obtained by the obtaining unit is greater than or equal to a predetermined time, and to control to play back the image sequence in a state that the display size or the display direction of the image sequence is based on the attitude detected by the detection unit, if the time of length of the image sequence obtained by the obtaining unit is less than the predetermined time.

* * * * *